United States Patent [19]

Kinney et al.

[11] 4,022,935
[45] May 10, 1977

[54] METHOD OF SPRAYING SEALING COMPOSITION TO INTERIOR WALLS OF STORAGE TANK

[76] Inventors: Paul W. Kinney, 1207 Evergreen Drive, Somerville, N.J. 08876; Carl Walter Kirk, 17 Jessica Lane, Warren, N.J. 07060

[22] Filed: Mar. 12, 1975

[21] Appl. No.: 557,896

[52] U.S. Cl. .............................. 427/140; 138/97; 138/98; 427/142; 427/236; 427/239; 427/421; 427/426

[51] Int. Cl.² .................................. B32B 35/00

[58] Field of Search .......... 427/140, 142, 230, 236, 427/239, 421, 426; 428/35, 36, 63; 134/22 C; 138/97, 98, 99; 15/61, 64, 246.5, 327 R; 156/94; 264/36

[56] References Cited

UNITED STATES PATENTS

| | | | |
|---|---|---|---|
| 3,578,479 | 5/1971 | Packo | 264/36 |
| 3,772,113 | 11/1973 | Patrick | 156/94 |
| 3,930,068 | 12/1975 | Sloan | 427/140 |

*Primary Examiner*—Thomas J. Herbert, Jr.
*Assistant Examiner*—Bruce H. Hess
*Attorney, Agent, or Firm*—Frederick W. Padden

[57] ABSTRACT

This specification describes a process and apparatus for closing leaks and spraying a sealant composition to interior walls of an underground gasoline tank such as is used in retail gasoline service stations. A gas tank suspected of leaks is emptied of stored gas and purged with compressor air applied thru a valve control and pipe conduit threadly inserted in the conventional fill pipe of the tank. The pipe conduit includes a means defining an aperture at the lower extremity of the conduit which extends into the tank interior. An explosion safety level meter is attached to the pipe conduit for providing a humanly detectable signal of the environment within the tank. An excavation enables a craftsperson to cut an access port through the tank wall for entering the tank interior, cleaning-up residue, sandblasting the interior walls, and spraying a sealant composition of thixotropic polyester resin and a catalyst onto the sandblasted walls.

5 Claims, 2 Drawing Figures

4,022,935

METHOD OF SPRAYING SEALING COMPOSITION TO INTERIOR WALLS OF STORAGE TANK

BACKGROUND OF THE INVENTION

This invention relates to a method and apparatus for sealing the interior of a tank container.

A problem in the prior art is that tank containers often develop leaks due to, for example, structural material defects, rust and corrosion. Such leaks have plagued the petroleum industry and specifically the retail gasoline service station business. In the operation of gasoline stations, leaks generally result in contamination of gasoline illustratively by water seepage into an underground tank. Typically, there are substantial delays before such contamination is detected and significantly many customer vehicles are subjected to wasteful, faulty and uneconomical operation and necessary contamination cleansing repair. Such factors have stimulated efforts to minimize leakage in tanks and importantly have militated toward fulfilling the need for a method and means for sealing against leaks which may occur in tanks particularly after they have been in use for a prolong time.

SUMMARY OF THE INVENTION

The foregoing problem is solved and need fulfilled in accordance with specific exemplary process and apparatus for repairing and sealing leaks in a gasoline tank. The exemplary disclosure enables an undergound tank, which is suspected to have leaks, to be emptied of gas and then to be purged with compressor air fed through a copper pipe inserted into a conventional fill pipe attached to the tank. The purging is to reduce the possibility of explosion during an opening of an access port for a craftsman to enter the tank interior. The aforementioned copper pipe communicates with a compressor via a valve and coupling arrangement for the air purging. The pipe is also equipped with an aperture at a lower extremity for permitting the passage of the compressed air into the tank interior. Next, an excavation is dug to obtain access to the tank.

A test is thereafter made to determine the explosive hazardousness of the environment in the tank interior. During the test, the supply of compressor air is withdrawn by closing the valve mechanism. Upon the test indicating a safe level within the tank, a segment of the tank is marked and cut out to provide an access port for the craftsman and the tools needed for the tank repair and sealing operations. The craftsman thereafter selectively pours an oil and gas absorber substance into the tank interior to absorb residual oil, gas and other liquid.

The process continues with the person entering the tank by means of a safety ladder and begins a cleanup operation. Upon its completion, any detectable seepage holes in the tank are repaired with a screw-plug assembly. The interior walls of the tank are thereafter sandblasted to a "white" metal surface to provide an appropriate adherent surface for a sprayable sealing composition. Before the spraying function is begun, another cleanup operation is conducted within the tank. For safety reasons, the craftsman performs the cleanup operation with a plastic pail and aluminum shovel.

The spraying operation is conducted with conventional equipment comprising a spray gun having a dual tip nozzle for defining a fine spray mist in which the sealant composition and a catalyst mix together and adhere to the "white" metal surfaces of the tank. The spraying illustratively is used to coat the entire interior surfaces of the gas tank.

The composition and catalyst are formulated to be sprayable, curable at ambient temperatures and humidity after the catalyst is added, adherent to the sandblasted surfaces, and resistant to solvent action of gas after curing. The disclosed coating composition is a pigmented thixotropic polyester resin. The base resin is a neopentyl glycol isophthalic acid corrosion resistant polyester resin. Also included is a balance of styrene and a fumed silica. Promoters of cobalt octoate, copper naphthenate and lithium chloride and utilized. A methyl ethyl ketone peroxide mixture is used for curing. The curing catalyst is sprayed from one nozzle tip and the sealant composition from the second nozzle tip in propositions selectably based on temperature, humidity and curing time.

Following a completion of the spraying operations, the craftsman removes all spraying equipment and tools from the tank interior. While the craftsman is outside of the tank, he affixes a closure plate over the access port to again seal the tank for storing gasoline. The repair process is thus completed and the excavation may be refilled.

DRAWING DESCRIPTION

The foregoing features and advantages of this invention may be more fully understood by reading the following description of an exemplary embodiment thereof with reference to the drawing in which:

FIG. 1 shows a gasoline tank system with air pipe and test control apparatus as well as an access plate utilized in the sealing process; and FIG. 2 is a section view of a closure plate assembly employed for closing an access port in the wall of the tank.

DETAILED DESCRIPTION

Figure 1:
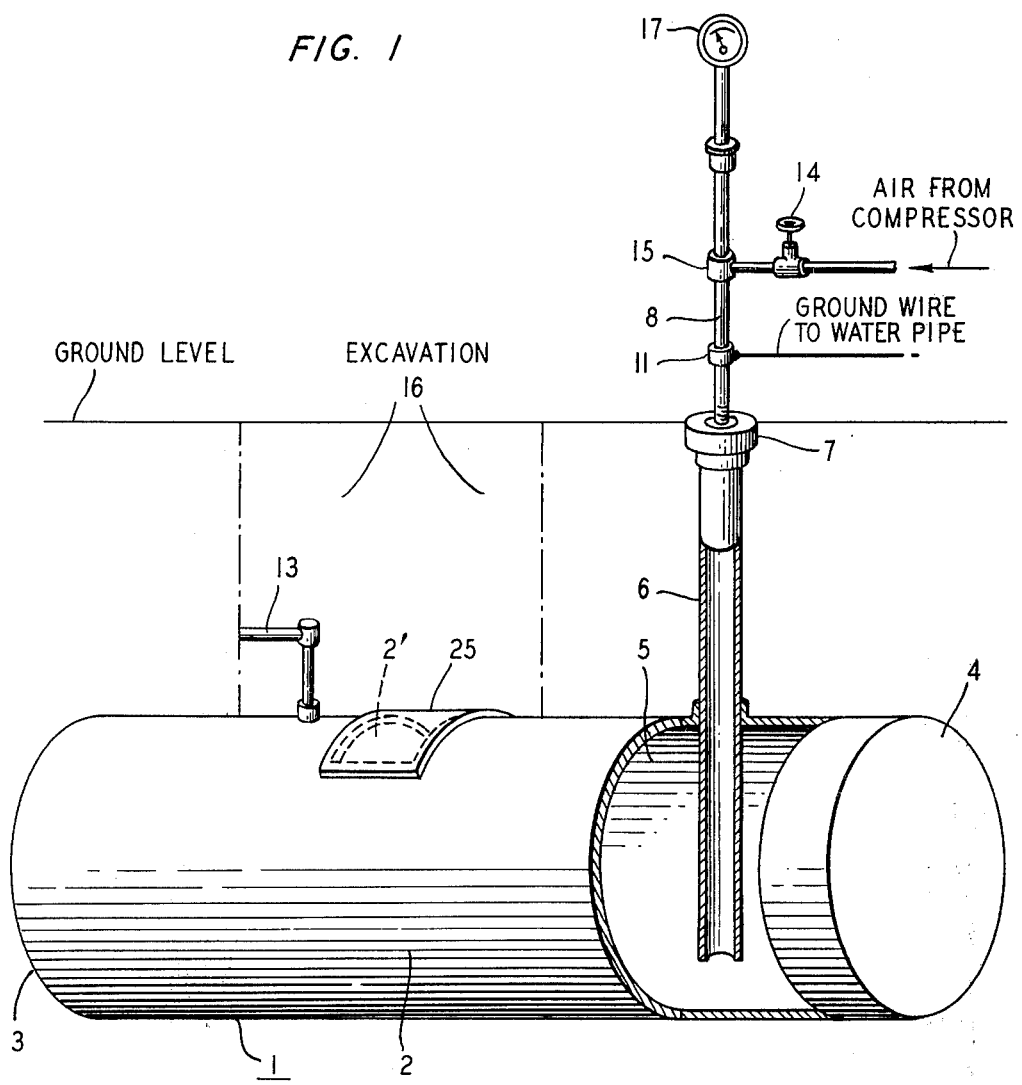

In FIG. 1 is shown a tank 1 having a side wall 2 defining a generally cylindrical shape for the tank and end walls 3 and 4 providing closure for a hollow tank interior 5 for storage of a fluid such as gasoline. A fill pipe 6 having a hollow interior communicates with the tank interior 5 and extends upwardly to ground level. An access plate coupling 7 is secured to the ground level extremity of pipe 6. In practice, gasoline is admitted in a known manner from a mobile tank vehicle through coupling 7 and pipe 6 for storage within the interior 5 and subsequent dispensing to customers.

According to this invention, when holes are suspected in the tank 1, the subject process is used to achieve a sealing of such holes. At the start, the balance of any fluid left in tank 1 is removed with the hand pump (not shown). Next, a copper pipe 8 of outside diameter less than the inner diameter of pipe 6 is threadly interfitted, or inserted, into pipe 6. The lower extremity of pipe 8 illustratively contains an aperture so that air may be admitted above ground level from a compressor (not shown) through pipe 8 and through the aperture (not shown) into interior 5. Vent pipe 13 is used for exhausting the fumes within tank 1 into the atmosphere.

The process continues by electricalwise securely connecting a ground wire clamp 11 around an exterior peripheral wall of pipe 8. A ground wire 12 is next extended from clamp 11 to a common ground of the building water line and separately to a conventional compressor (not shown) and to tank 1 via a vent pipe 13. The purpose of grounding pipe 8, tank 1 and the compressor is to reduce the possibility of static electricity buildup as compressed air is inserted from the compressor through a valve 14, coupling 15 and pipe 8 into the tank interior 5. the later function results in a reduction of explosive fumes in the tank interior 5.

Continuation of the process involves the digging of an excavation 16 to the top side of tank 1. Before seeking access through the excavation to the tank interior 5, a test is performed by means of a test device 17 operationally attached to an upper above ground level end of pipe 8. Device 17 suitably may be a J.W. Model G manufacturer Bacharack. It includes an indicator device which specifies the hazardousness of the mixture remaining within the interior 5 of tank 1 particularly following the admission of air through pipe 8. An acceptable safe level of the mixture is 20% lower than the lower explosive limit or less on the gas indicator meter. Upon obtaining such an indication, a person enters the excavation to mark and then cut out an exterior segment 2' of the tank wall 2 for enabling a person to obtain access to the interior 5. During the cutout step, for example, with an electric drill and saw, the copper pipe 8 is removed and a Venturi system employed to suck the air from the vent lines of the tank 1 through the fill pipe 6.

Thereafter, a person protected from head to foot and wearing rubber gloves enters the tank interior 5 through the access port 2' and using a small wooden step ladder to get down into the interior floor of tank 1. Any residue liquid and dampness lying at the bottom of tank 1 is absorbed by an oil and grease absorber. The absorber may be poured into the interior before the person enters the interior 5.

The person next proceeds to clean up residue materials within the tank 1. A small aluminum shovel (not shown) is used for this purpose. The material is shoveled into a plastic pail (not shown) which is admitted and withdrawn from interior 5 by a rope attached to the pail handle with the aid of a person outside of the tank.

After the tank is entirely cleaned and swept out, the interior of walls 2, 3, and 4 are sandblasted to a "white" metal finish free of corrosion and rust. Any holes, or apertures, which appear in the walls 2, 3, and 4 are plugged illustratively by the screw-type rawl plug assembly (not shown). The plugging operation may be required before the sandblasting where appropriate to preclude a fluid, such as water, from spouting into the tank interior 5 during cleanup operations.

Before proceeding further with the process of reconditioning and sealing the interior walls 2, 3, and 4, it is advantageous to explain the composition of the coating material used in spray coating. The coating is a pigmented thixotropic polyester resin compound especially formulated to be sprayable, curable at ambient temperature after a catalyst is added, adherent to a sandblasted surface such as steel, and resistant to solvent action of gasoline after curing. A coating material suitable for such purposes is available from W. R. Grace & Co., Marco Chemical Division, 1711 Elizabeth Avenue West, Linden, New Jersey 07036, and is identified as LB-377-9 polyester resin compound.

Resistance to gasoline is optimized by the chemical composition of the polyester system. The base resin is a neopentylglycol isophthalic acid corrosion resistant polyester resin, identified as Marco Division GR-77006.

Proper sprayability and nondraining characteristics of the spray coating are achieved by a balance of sytrene, which, in addition to being reactant, lowers the viscosity and Cabosil M-5, a finely divided fumed silica which contributes a yield value to the rheology of the system.

Curing at ambient temperatures is achieved by the use of promoters that cause the peroxide catalyst to be active at temperatures lower than its normal decomposition temperature.

Coloring is achieved by the use of pigments, such as titanium dioxide and copper phthalolocyanine blue in the form of predispersions in a polyester styrene base.

A preferred formulation is

| | |
|---|---|
| GR-77006 | 100 parts by weight |
| Styrene | 20.0 |
| Cabosil M-5 | 5.0 |
| Promoters | 0.35 |
| MC 254005 (70% TiO$_2$ dispersion) | 1.8 |
| PDI Blue 1310 (25% Phthalo blue dispersion) | 0.12 |

A promoter formulation illustratively includes:

| | |
|---|---|
| 12% Cobalt Octoate | 0.125 |
| 6% Copper Naphthenate | 0.012 |
| Lithium Chloride | 0.125 |

Curing is accomplished by adding methyl ethyl ketone peroxide for the ambient temperature. The following illustrates amounts to be used at various temperatures. While a greater amount will cause the curing reaction to proceed at a greater rate, it also reduces pot life and may contribute to clogging of the spray equipment (not shown).

| | 62° F | 77° F | 90° F |
|---|---|---|---|
| 0.5% MEKP gel time minutes | 59 | 34 | 13 |
| 0.75% MEKP gel time minutes | 36 | 26 | 11 |

A preferred way to add the catalyst is with spraying equipment designed to accomplish mixing in a fine spray after the resin and catalyst are propelled from the sprayer from separate tips of a spray nozzle. Separate feed streams contribute to the regulation of proportions and to the fast rate of curing of the coating.

In the examplary arrangement, a spray gun is equipped with a two-tip type nozzle (not shown) which illustratively is commercially known as manufactured by Maverick. The coating composition regulatedly flows from a supply container through one tip of the gun while the catalyst material flows from another supply container (such as a stainless steel pressure pot) through the second tip of the gun. In practice, the spray streams at approximately 24–36 inches from the spray tips to the walls 2, 3, or 4 provide advantageous mixtures.

The foregoing process after sandblasting requires another cleanup of residue material in preparation for applying the spray sealing material. After it has been completed, the gun of the spraying equipment is extended to the person in the tank interior who then adjusts the spray tips for composition and catalyst according to ambient temperature, humidity and curing time. The person then proceeds to spray the material uniformly over the interior walls 2, 3, and 4 of the tank interior 5. Upon completion of the spraying, the person exits from the interior 5 with all process tools. A cover plate 25 bent to the exterior shape of wall 2 is then sprayed and affixed by nuts and bolts of FIG. 2 over the access port 2'. Tank 1 after the curing time may then be refilled for storage purposes.

Figure 2:
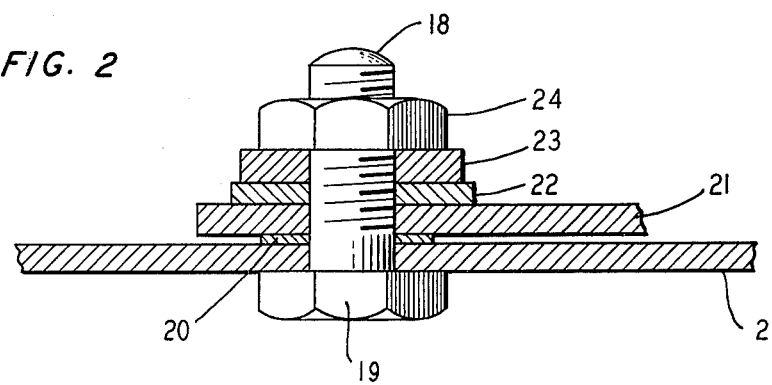

As shown in FIG. 2, the closure assembly comprises a threaded bolt 18 which extends through a wall 2 of tank 1 with its head 19 at the tank exterior and its threaded portion extending into interior 5. A horseshoe-shaped lock nut illustratively of spring steel is threadly fastened to bolt 18 and into engagement with an interior segment of wall 2. A section 21 of plate 25 which bent matingly to interfit with the shape of the wall 2 is next inserted via its apertured segment over the bolt 18 threaded portion for closing of the hole 2' in wall 2. A washer 22, lock nut 23 and hexnut are sequentially inserted over the bolt 18 threaded portion for threadly fastening the assembly to close securely the opening 2' between the interior and exterior of wall 2. An appropriate sealant may then be sprayed over the entire perimeter of plate 25 to seal the tank 1.

In light of the foregoing teaching, it is apparent that those skilled in the art may design numerous other processes and structural embodiments without departing from the spirit and scope of this invention.

What is claimed is:

1. A method of sealing leaks in a storage tank having walls defining an enclosed interior and connected to a fill pipe through which a liquid is admitted to said interior for storage and comprising the steps of emptying said tank interior of stored liquid, admitting a supply of air through said fill pipe for purging any stored liquid residue within said tank interior, determining a safety level of said tank interior through said fill pipe, opening an access port from an exterior to said interior of said tank through said walls, removing residual liquid material from said tank interior.

establishing sealant composition adherent surfaces on said walls within said tank interior, and spraying a sealant composition of thixotropic polyester resin and said sealant composition comprises a base resin of neopentyl glycol isophthalic acid corrosion resistant polyester resin, styrene and fumed silica and cobalt octoate, copper naphthenate and lithium chloride, to said adherent surfaces.

2. A method in accordance with claim 1 in which said step of admitting said supply of air comprises supplying compressor air and coupling said compressor air through a valve control and said fill pipe to said interior of said tank.

3. A method in accordance with claim 2 in which said coupling of said compressor air through said valve and said fill pipe to said tank interior comprises channeling said compressor air from said valve control through a pipe conduit inserted in said fill pipe.

4. A method in accordance with claim 1 in which said step of establishing sealant composition adherent surfaces comprises sandblasting said walls within said interior of said tank to provide sealant composition adherent surfaces thereon.

5. A method in accordance with claim 1 in which said step of spraying said sealant composition comprises spraying said neopentyl glycol isophthalic acid corrosion resistant polyester resin, styrene and fumed silica from a tip of a spray nozzle in a predetermined proportion onto said adherent surfaces and said cobalt octoate, copper naphthenate and lithium chloride from a separate tip of said spray nozzle in another predetermined proportion onto said adherent surfaces.

* * * * *